United States Patent [19]

Kumar

[11] Patent Number: 5,033,677
[45] Date of Patent: Jul. 23, 1991

[54] VORTEX VALVE-CONTROLLED FUEL INJECTOR

[76] Inventor: Viraraghavan S. Kumar, 107 Nemo Cir., Palm Bay, Fla. 32907

[21] Appl. No.: 404,349

[22] Filed: Sep. 7, 1989

[51] Int. Cl.⁵ ............................................. F02D 19/04
[52] U.S. Cl. .................................. 239/32.3; 239/569; 239/585; 137/605
[58] Field of Search .................. 239/132.1, 132.3, 132, 239/585, 569; 137/605

[56] References Cited

U.S. PATENT DOCUMENTS

| | | | |
|---|---|---|---|
| 4,094,465 | 6/1978 | Bastenhof | 239/132.3 |
| 4,192,466 | 3/1980 | Tanasawa et al. | 239/533.12 X |
| 4,360,161 | 11/1982 | Claxton et al. | 239/585 X |
| 4,862,837 | 9/1989 | Holmes | 239/406 |

Primary Examiner—Andres Kashnikow
Assistant Examiner—William Grant
Attorney, Agent, or Firm—Evenson, Wands, Edwards Lenahan & McKeown

[57] ABSTRACT

A solenoid-controlled fuel injection device, particularly useful for injecting non-Newtonian types of fuel materials, such as coal slurry, to a preburn chamber of an internal combustion engine, comprises a wet-type solenoid unit and a vortex valve unit integrated together in a modular configuration. The solenoid unit contains a magnetic coil surrounding a coaxial control fluid-sealing bore through which a cylindrical armature is translated. The armature has a coaxial armature stem which is engaged by the valve stem of the vortex valve unit. The vortex valve stem is supported on a compression spring within the longitudinal bore of a valve body, coaxial with the bore of the solenoid unit and engages a poppet valve seat adjacent to a vortex valve element. A control fluid supply inlet is coupled to the longitudinal bore, while a fuel supply bore is coupled to a fuel input port to the vortex chamber of the vortex valve. Until the coil is energized, the valve stem is spring-biased away from the valve seat, so that control fluid in the longitudinal bore is directed into the vortex chamber, to prevent fuel from being supplied from an outlet nozzle. When the coil is energized, the armature translates the valve stem against the spring bias, to contact the poppet seat and cut off control fluid to the vortex valve, whereby fuel is injected via the nozzle at the vortex chamber output port.

22 Claims, 5 Drawing Sheets

VORTEX VALVE-CONTROLLED FUEL INJECTOR

FIELD OF THE INVENTION

The present invention relates in general to a fluid injection apparatus, and is particularly directed to a fuel injection apparatus, the fuel spray output of which is controlled by means of an electromagnetically driven, vortex valve.

BACKGROUND OF THE INVENTION

Fluid delivery mechanisms, such as coal slurry, fuel injector systems, commonly employ some form of electro-mechanical metering device through which a measured quantity of fluid is delivered at its output port to a fluid operation region (e.g. the combustion chamber of a diesel engine). Unfortunately, because the viscosity behavior of such fluids tends to be non-Newtonian, (similar to that of plastic materials), flow-feed and directing modules through which these fluids pass, for example, high pressure miniature nozzle components and associated electro-mechanical fluid supply elements, often become clogged in a very short period of time.

SUMMARY OF THE INVENTION

In accordance with the present invention, the drawbacks of conventional electro-mechanical fuel flow control mechanisms, such as the above-referenced coal slurry metering devices, are obviated by a new and improved fluid flow control apparatus, which successfully integrates a fluidics-controlled vortex valve and an electromagnetic control unit, through which flow-control fluid to the vortex valve is metered, into a compact modular configuration, capable of effecting precision control over the delivery of fluids, (e.g a coal slurry), to an output utility device, such as a diesel engine combustion chamber. More particularly, the solenoid-controlled fluid injection device according to the present invention comprises a wet-type solenoid unit including a generally cylindrically shaped housing having a longitudinal fluid-sealing bore. The housing contains an electromagnetic coil and an associated cylindrical armature that is arranged to be translated along the coil axis and which has a longitudinal fluid flow passageway to facilitate fluid communication through the bore. A coaxial armature stem is affixed to the armature and extends beyond the solenoid coil to engage a fluid flow control valve. The solenoid unit further includes an armature guide sleeve through which the armature stem slides to engage the valve stem, the armature guide sleeve being captured within the bore of the housing. The armature guide sleeve is spaced apart from a lower end of the armature by a spacer member of non-magnetic material and a gap therebetween.

The fluid flow control valve includes a generally cylindrical valve body having a longitudinal bore that is coaxial with the fluid-sealing bore of the solenoid unit housing, a working fluid (e.g. coal slurry) supply passageway coupled to a working fluid supply input port, and a control fluid (e.g. compressed air, nitrogen) passageway coupled between the longitudinal bore and a control fluid supply input port. Situated at one end of the valve body is a vortex valve element having a control fluid inlet coupled to the longitudinal bore through the valve body, a main fluid inlet coupled to the working fluid supply passageway, a vortex chamber to which the control and working fluid inlets are coupled, and an outlet, coupled to the vortex chamber. A valve stem is supported for axial movement within the longitudinal bore through the valve body. A first, upper portion of the valve stem is urged toward and into mechanical engagement with the armature stem by means of a spring that engages the longitudinal bore and the valve stem. A second, lower end of the valve stem is disposed adjacent to a valve seat which has a control fluid throat for coupling the longitudinal bore of the valve body to the control fluid inlet of the vortex valve element and is arranged to be engaged by the lower end of the valve stem.

In the absence of current flow through the solenoid coil, the valve stem is urged upwardly by the spring against the armature stem, so that the lower portion of the valve stem is separated from the valve seat. As a consequence control fluid within the longitudinal bore of the valve body passes through the control fluid throat of the valve seat to the vortex valve, thereby preventing cutting off the working fluid inlet port to the vortex valve and preventing working fluid from being supplied from a fluid spray outlet of the vortex valve. On the other hand, in response to energization of the solenoid coil, the valve stem is translated downwardly, by the axial translation of the armature, against the upward biasing action of the spring and its associated armature stem, so that the lower portion of the valve stem is forced against the valve seat and thereby interrupts the passage of control fluid through the control fluid throat to the vortex valve, thereby permitting the working fluid to enter the vortex valve chamber and be emitted via an outlet nozzle spray plate. The vortex valve itself is formed within a vortex valve disc element that is captured by a nozzle cap having a fluid spray nozzle coupled in fluid communication with the outlet of the vortex valve element. The nozzle cap mechanically engages the injection valve body so as to retain the vortex valve element in contiguous engagement with an end face of the injection valve body.

The valve stem has a generally cylindrical shape with an annular indent portion and a depression region longitudinally extending therefrom, so as to provide, in cooperation with the longitudinal bore through the valve body, a control fluid cavity region extending along the surface of said valve stem and thereby maintaining a fluid communication path between said control fluid supply input port and the control fluid inlet of the vortex chamber of the vortex valve element. It also has a pair of longitudinal holes, that are intersected by a transverse hole through the annular indent portion, which serve to equalize the fluid pressure longitudinally along the valve stem.

The valve body further includes a cooling fluid passageway coupled between cooling fluid inlet and outlet ports. This cooling fluid passageway comprises a pair of cooling fluid bores extending from cooling fluid input and output ports through the injection valve body portion to a first flattened land region of the body and to the vortex valve element, the vortex valve element having a cooling fluid inlet, a cooling fluid outlet, and a cooling fluid communication path therebetween. The cooling fluid outlet opens to an outer wall of the vortex element that is adjacent to a second flattened land of the body, diametrically opposite to the first flattened land region. The first and second flattened land regions are coupled in fluid communication with one another by an annular recess around the body. The nozzle and the lower part of the body are covered by the nozzle cap, whereby cooling fluid is permitted to travel between the exterior surface of the injection valve body portion (by way of the first and second flattened land regions and the annular recess) and the nozzle cap. One of the pair of cooling fluid bores is coupled with the cooling fluid inlet of the vortex element and the other of the pair of cooling fluid bores is coupled to an outer wall of the injection valve body portion.

DETAILED DESCRIPTION

Figure 1:
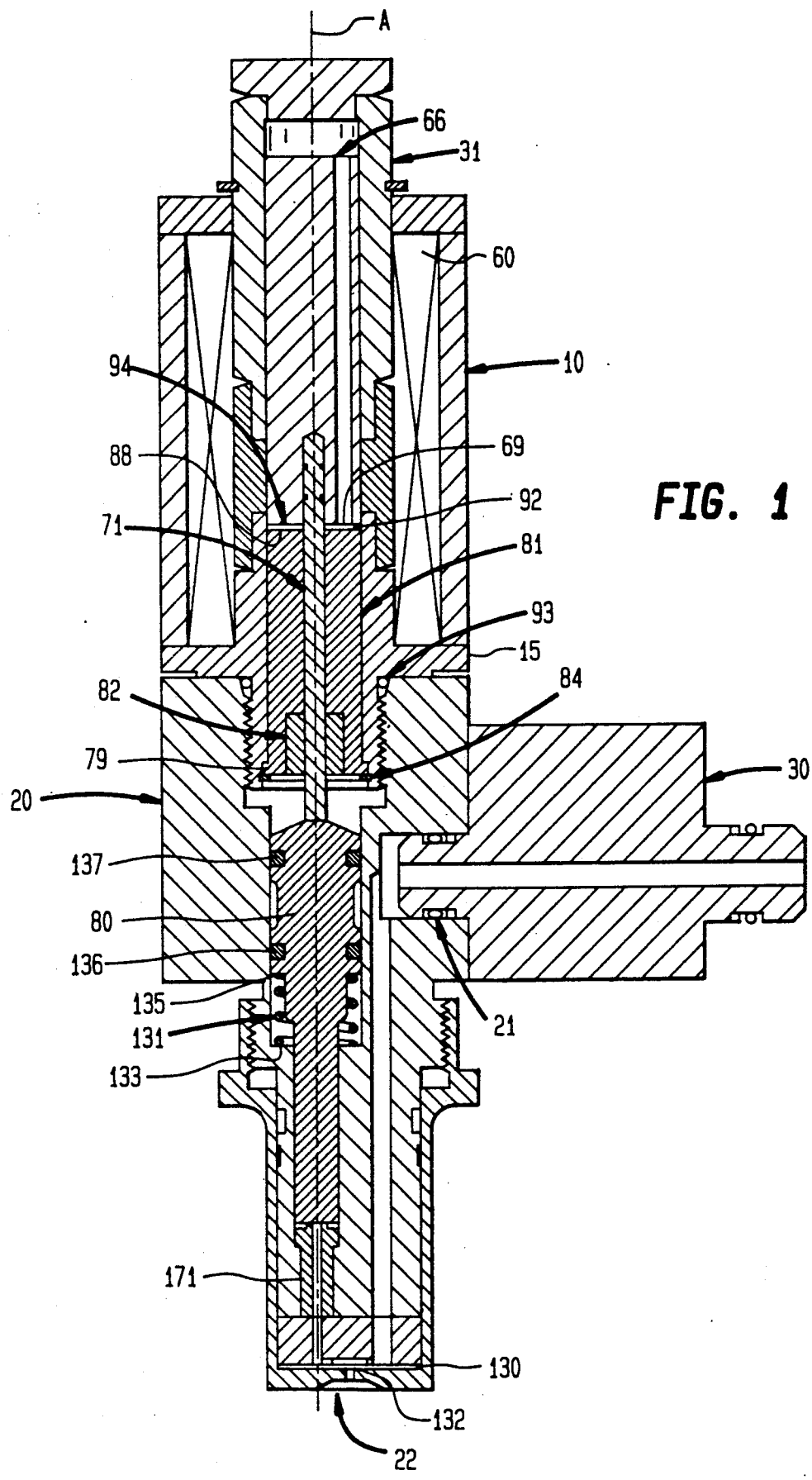
FIG. 1 is a longitudinal, cross-sectional illustration of an assembled solenoid-driven, vortex valve mechanism embodying the present invention.
Figure 2:
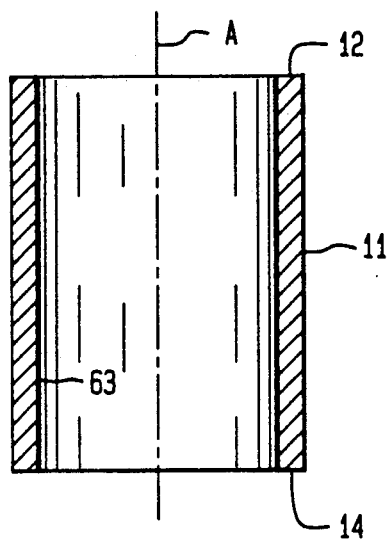
FIGS. 2-14 are diagrammatic detailed cross-sectional views of components of mechanism of FIG. 1.
Figure 3:
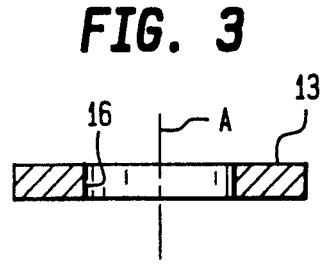
Figure 5:
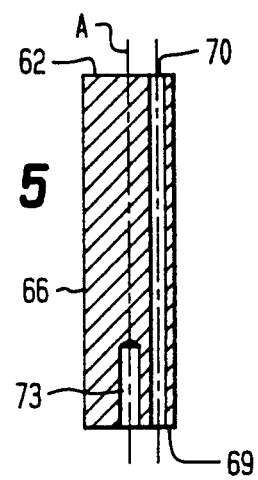
Figure 14:
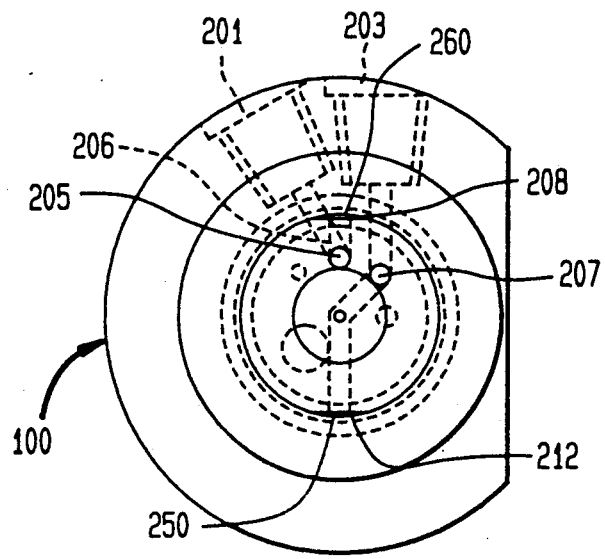
Figure 15:
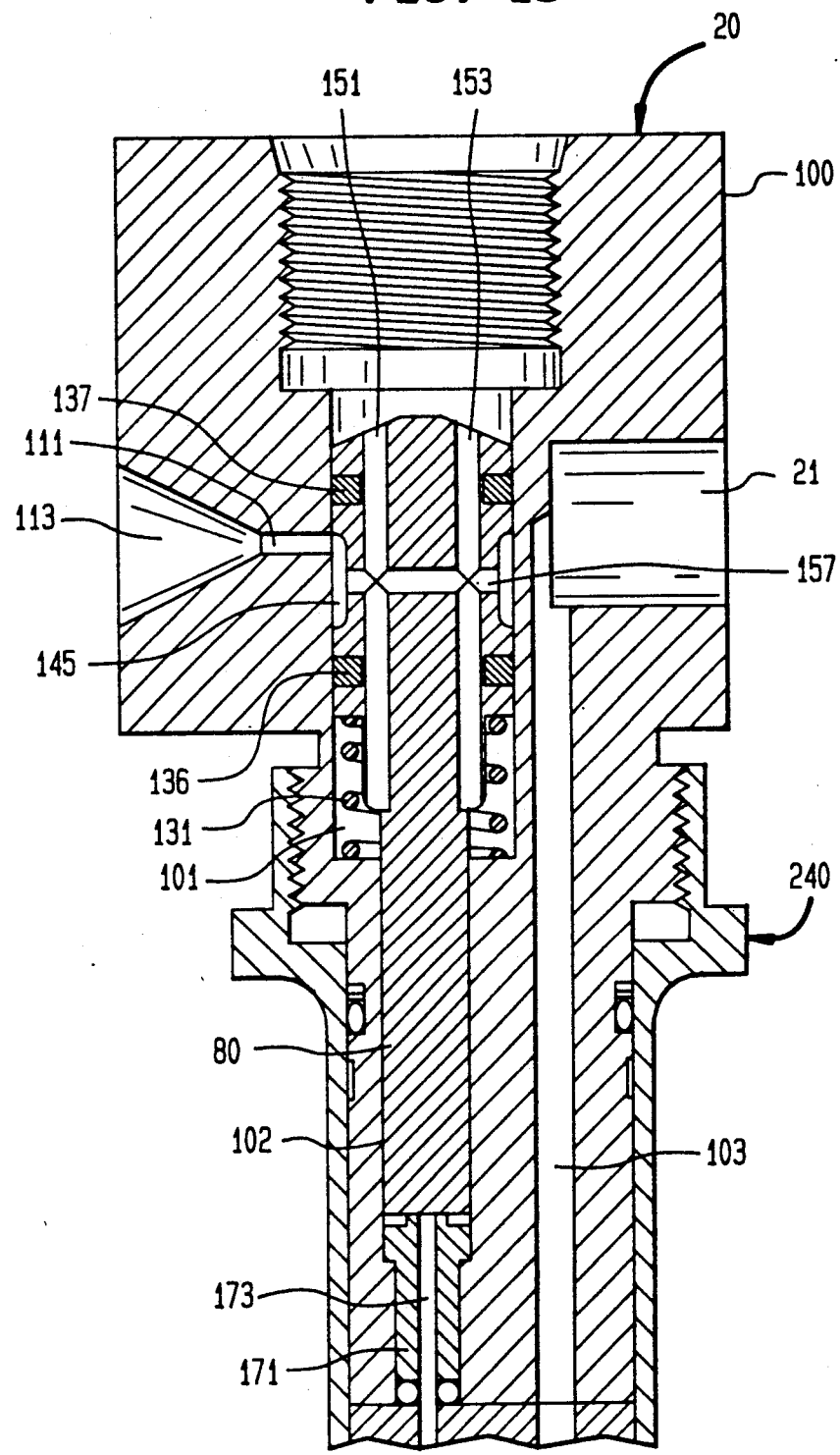
FIG. 15 is a longitudinal, cross-sectional illustration of a portion of the valve mechanism of FIG. 1.

Referring now to the drawings, FIG. 1 is a longitudinal, cross-sectional illustration of an assembled solenoid-driven, vortex valve mechanism embodying the present invention, FIG. 15 is a longitudinal, cross-sectional illustration of a portion of the valve mechanism of FIG. 1, while FIGS. 2-14 are cross-sectional views of individual components. (In the description to follow, in order to avoid unnecessary cluttering, FIG. 1 and 15 are not labelled with all of the reference numerals that are employed in FIGS. 2-14, wherein the individual components of FIGS. 1 and 15 are labelled in detail.) In accordance with a preferred embodiment of the present invention, the mechanism is of generally cylindrical configuration and, unless otherwise indicated, the cross-sectional illustrations of the Figures are assumed to taken along a plane containing a cylindrical axis of symmetry A.

Figure 4:
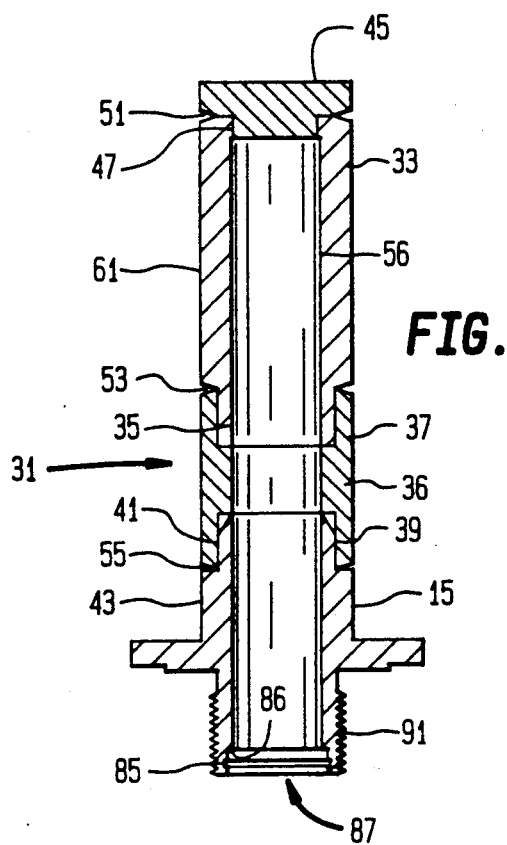
Figure 6:
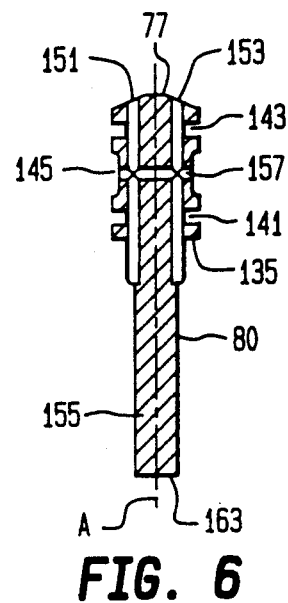
Figure 7:
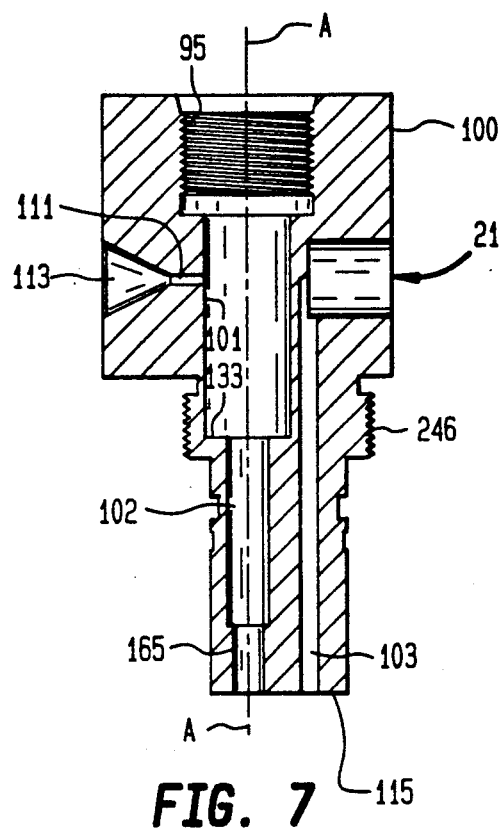

As illustrated in FIG. 1, the solenoid-driven vortex valve mechanism according to the present invention includes a generally cylindrical solenoid drive unit 10 and a vortex valve unit 20, shown in FIG. 15, which is mechanically joined to solenoid drive unit 10 for electromagnetically controlling its operation and, thereby, the flow of a working fluid (e.g. diesel engine fuel) between a working fluid (fuel) input port 21 (via an injector coupler 30) and a fluid output or nozzle spray port 22. As noted briefly above, solenoid unit 10 comprises a sealed, 'wet-type' solenoid unit, in that it is filled/pressurized with a control fluid that is used to control the operation of the vortex valve. For this purpose unit 10 is formed of a generally cylindrically shaped coil housing 11 (FIG. 2), a top surface 12 of which is closed by a cap 13 (FIG. 3) and a bottom surface 14 of which engages a generally inverted-T shaped solenoid base 15 of a cylindrical armature guide unit 31 (FIG. 4).

Cap 13 has a central circular aperture 16, coaxial with axis A, within which a cylindrical magnetic sleeve 33 is snugly fit for engagement, at a shoulder portion 35, with an upper annular recessed end portion 37 of a hollow, tubular non-magnetic (e.g. brass) sleeve member 36. A lower annular recessed end portion 39 of tubular sleeve member 36 is similarly engaged by a shoulder portion 41 of a generally cylindrical pedestal portion 43 of base 15. The top or open end 47 of magnetic sleeve 33 is closed off by way of a stepped disc-shaped plug 45. Weld joints 51, 53 and 55 serve to join together plug 45, magnetic sleeve 33, non-magnetic tubular sleeve 36 and base 15, and effectively sealing interior bore 56 of armature guide unit 31.

A magnetic coil 60 is captured between the outer cylindrical wall 61 of guide unit 31 and the interior cylindrical wall 63 of coil housing 11. An associated cylindrical armature 66 (FIG. 5) is arranged to be translated along axis A within the interior longitudinal bore 56 of armature guide unit 31. Armature 66 has a longitudinal fluid flow passageway 70 extending between upper and lower armature end faces 68 and 69 to facilitate fluid communication through the bore. A coaxial, generally rod-shaped armature stem 71 is friction fit within a stem-receiving slot 73 in lower armature end face 69 and extends beyond the solenoid coil through guide unit 31 to engage a valve stem 80 (FIG. 6) within fluid flow control valve unit 20.

For this purpose, base 15 further includes a generally cylindrical armature guide sleeve 81 through which armature stem 71 slides to engage the valve stem. Armature guide sleeve 81 is made of magnetic material and is captured within bore 56 by means of an annular snap ring 84 that is snap fit within an annular indent 85 at a lower end portion 87 of base 15 and thereby retains a lower lip portion 79 of armature guide sleeve against recessed rim region 86 of base 15. A dielectric (e.g. Teflon (Dupont trademark)) bushing 82 slidably retains armature stem 71 within armature guide sleeve 81 and serves as a resilient end surface element for a top surface portion 77 of valve stem 80 where the valve stem engages armature stem 71. With magnetic coil 60 deenergized, the dimensions of the armature and valve stem components are such that a top face 88 of armature guide sleeve 81 is spaced apart from lower end face 69 of armature 66 by a washer 92 of non-magnetic material and an additional (variable reluctance) gap 94 therebetween. When coil 60 is energized, causing axially downward displacement of armature 66, the gap spacing decreases, thus decreasing the reluctance in the magnetic circuit between armature 66 and armature guide sleeve 81. Washer 92 is made of non-magnetic material to prevent armature 66 from magnetically attaching itself to guide sleeve 81.

To facilitate a tight sealed engagement between solenoid unit 10 and vortex valve unit 20, base 15 is threaded at a lower outer portion 91, so that it may be threaded into an associated threaded interior cylindrical engagement bore region 95 of a valve body 100 (FIG. 7) of vortex valve unit 20. An 0-ring 93 provides a tight fluid seal within the threaded bores of base 15 and valve body 100.

Vortex valve unit 20 includes generally cylindrical valve body 100 having a longitudinal bore 101 that is coaxial with fluid-sealing bore 56 of solenoid unit 10, a working fluid (e.g. coal slurry) supply passageway 103 coupled to a working fluid input port 21, and a control fluid (e.g. compressed air, nitrogen) passageway 111 coupled between longitudinal bore 101 and a control fluid input port 113. Contiguous with a lower end face 115 of valve body 100 is a generally disc-shaped vortex valve element 110 (FIGS. 8-10) having a control fluid inlet 121 coupled to longitudinal bore 101 through the valve body, a working fluid inlet 123 coupled to working fluid supply passageway 103, and a vortex chamber 125 to which control and working fluid inlets 121 an 123, respectively, are coupled. Contiguous with a bottom face 124 of vortex valve element 110 is a circular spray plate or disc 130 having a centrally located hole 132, that closes fluid inlets 121 and 123 and vortex chamber, and provides an exit port for the vortex chamber.

Valve stem 80 is supported for axial movement within longitudinal bore 101 through valve body 100. Top face portion 77 of the valve stem is urged toward and into mechanical engagement with armature stem 81 by means of a compression spring 131 that is confined between a shoulder region 133 of longitudinal bore 101 and a rim land region 135 of valve stem 80, so as to normally urge valve stem 80 upwardly against armature stem 81. Valve stem 80 has a pair of (Teflon) guide rings 136 and 137 captured in respective annular slots 141 and 143, for maintaining valve stem 80 aligned within longitudinal bore 101. Between these annular slots, the exterior surface of valve stem 80 has an annular groove 145, which is sized so as to be in continuous fluid communication with control fluid passageway 111. To ensure control fluid communication throughout bore 101, a pair of longitudinal holes 151 and 153 Are drilled through valve stem 80 between top face portion 77 and a lower, neck portion 155, and a transverse hole 157 is drilled from annular groove so at to intersect each of holes 151 and 153.

The lower, neck portion 155 of valve stem 80 extends through a reduced diameter region 102 of longitudinal bore 101 and terminates at a lower, flattened end face 163 adjacent to a 'poppet' type valve seat 171 (shown in detail in FIG. 11), which fits within the lowermost portion 165 of longitudinal bore 101 and terminates at lower end face 115 of valve body 100. Valve seat 171 has a control fluid throat 173, coaxial with bore axis A, for coupling longitudinal bore 101 of valve body 100 to control fluid inlet 121 of the vortex valve element, and a flattened circular lip portion 175 which is arranged to be engaged by the lower face 163 of valve stem 80.

Figure 12:
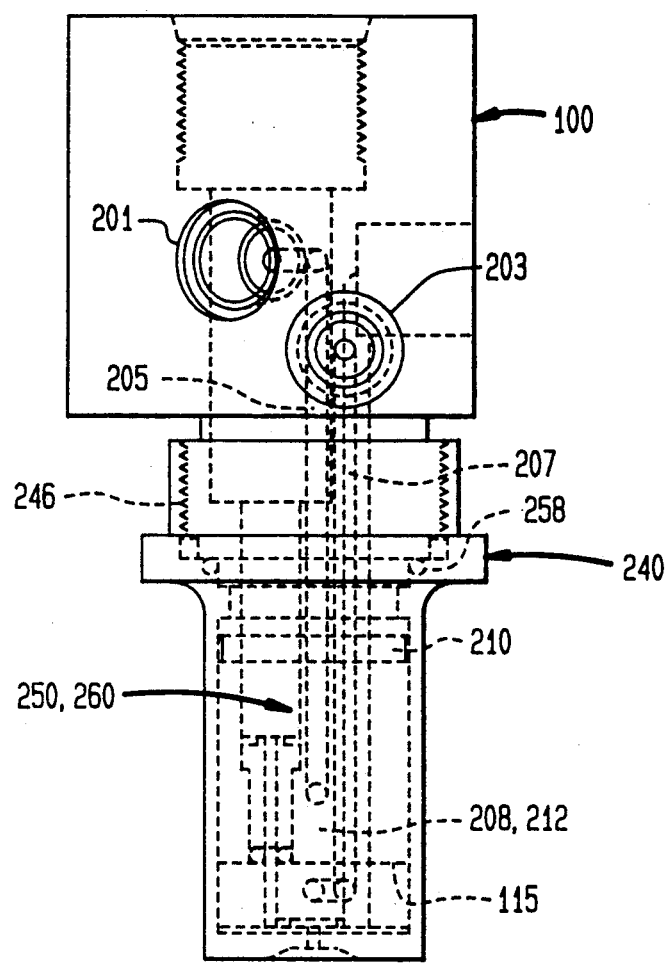

To maintain its structural integrity and minimize metal fatigue in the course of its exposure to the high temperature environment of an internal combustion chamber, valve body 100 further includes a cooling fluid flow configuration shown in detail in FIGS. 12 and 14. Specifically, body 100 includes a pair of cooling fluid ports 201, 202, respectively coupled to longitudinal cooling bores 205, 207 through the valve body. One of ports 201, 203 is coupled to a source of cooling fluid (e.g. water) and the other is a cooling fluid return port. Bore 207 terminates at lower end face 115, while bore 205 extends to a radial port 206 which opens to a flattened land region 208 extending longitudinally along the body between port 206 and an annular recess portion 210, axially spaced apart from the location of port 206. Diametrically opposite to flattened land region 208, on body 100, is a further flattened land region 212, which extends longitudinally along body 100 and joins a like flattened surface region 227 of vortex valve element 110 (FIG. 8).

Figures 8, 9:
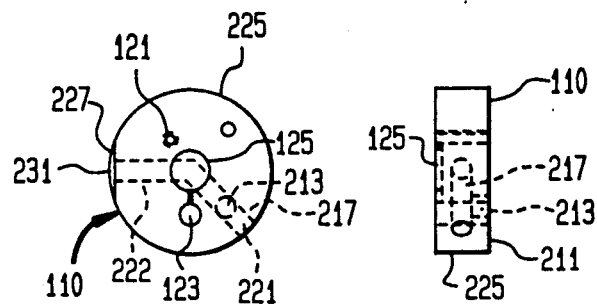
Figure 10:
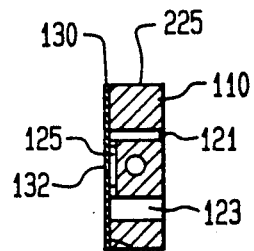
Figure 13:
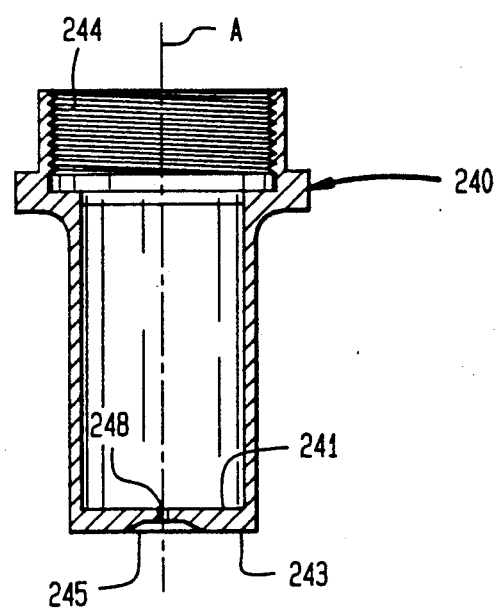
Figure 11:
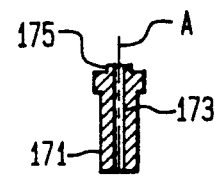

More particularly, as shown in FIGS. 8 and 9, the top face 211 of vortex valve element 110 has a cooling fluid coupling orifice 213 aligned with cooling fluid bore 207 in the lower end face 115 of valve body 100. Orifice 213 intersects a cooling fluid channel 217, which is formed of a pair of cross bores 221, 223 transversely drilled into vortex valve element from its generally cylindrical outer surface 225. That portion of outer surface 225 of valve element 110 intersected by cross bore 222 is machined into generally flattened surface region 227, so as to create a (cooling fluid flow) separation region 231 between the generally cylindrical interior surface of a nozzle cap 240 (FIG. 13) and body 100. As noted above, flattened surface region 227 joins, or can be considered to be an extension of, flattened land region 212 of body 100, so that a cooling fluid channel is formed between the body and the nozzle cap. Annular recess portion 210 connects each flattened land region to provide fluid flow communication between bores 205 and 207 along the exterior surface of body 100.

An interior wall region 244 of nozzle cap 240 is threaded onto a corresponding threaded external surface portion 246 of valve body 110. Nozzle cap 240 receives spray plate 130 between valve element 110 and the bottom interior surface 241 of the cap, and secures valve element 110 against lower end face 115 of valve body 100. The bottom exterior face 243 of nozzle cap 240 has a spray nozzle 245 in fluid communication with vortex chamber 125, via aperture 248 in cap 240 and central hole 132 in spray plate 130.

As described above, land region 212 of valve body 100, adjacent to flattened surface region 227 of valve element 110, is flattened, so as to provide an extension of separation region 231 along the outer surface of valve body 100 to provide a cooling channel 250. A like flattened surface region 208 is formed on the opposite side of valve body 100, to form a similar cooling channel 260 between nozzle cap 240 and valve body 100. An O-ring 258 is retained in a further annular groove 255 for effectively sealing the cooling channels. As a consequence, cooling fluid introduced through one of the cooling fluid ports, for example port 203, travels through its associated cooling bore 207, enters cooling fluid orifice 213 and travels through cross cooling channel 217 within valve element 110. The cooling fluid then exits cross bore 222 into cooling channel 260 between valve body 100 and nozzle cap 240. From cooling channel 260, the fluid travels up to annular recess 210 and then down along channel 250 to radial port 206, through which it enters cooling bore 205 for passage to return port 201.

In operation, when solenoid coil 60 is not energized, so that no magnetic force is acting upon armature 66 to force the armature stem 71 downwardly, valve stem 80 is biased upwardly by spring 131 against the armature stem, so that the flattened end face 163 of valve stem 80 is spaced apart from valve seat 171. As a consequence, control fluid that has been introduced under pressure through control fluid input port 113 into longitudinal bore 101 of the valve body, filling both bore 56 within wet solenoid unit 10 and bore 101 within valve unit 20, is forced through the control fluid throat 121 of the valve seat into vortex chamber 125, thereby cutting off the working fluid inlet port 123 to the vortex valve and preventing working fluid from being supplied from spray nozzle 245.

Conversely, when energizing current is applied to the solenoid coil, armature 66 and armature stem 71 are translated downwardly, pushing down valve stem 80 against the upward biasing action of spring 131, so that the flattened end face 163 of valve stem 80 is forced against lip portion 175 of valve seat 171, and thereby interrupts the flow of control fluid through control fluid throat 121 into vortex valve 110. With the flow of control fluid into vortex chamber 125 interrupted, working fluid is permitted to enter and pass through vortex valve chamber 125, so as to be emitted via spray nozzle 242.

As will be appreciated from the foregoing description, the shortcomings of conventional electromechanical fluid delivery mechanisms, such fuel injector devices for injecting fuel to the combustion chamber of a diesel engine, are obviated by a new and improved fluid flow control apparatus, which successfully integrates a fluidics-controlled vortex valve and an electromagnetic control unit, into a compact modular configuration, capable of effecting precision control over the delivery of a working fluid to an output utility device, such as the preburn chamber of a diesel engine.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed

1. A solenoid-controlled fluid injection device comprising:
   a solenoid unit including a housing containing an electromagnetic coil, having a longitudinal axis and a bore coaxial therewith, for producing a magnetic field, said housing containing magnetic material for providing a flux path for said magnetic field, a movable armature disposed for axial movement within the bore of said electromagnetic coil, and an armature stem member coupled to said movable armature; and
   a fluid flow control valve coupled with said solenoid unit, and including
   a valve body having a longitudinal bore that is coaxial with the bore of said electromagnetic coil, a main fluid supply passageway coupled to a main fluid supply input port, and a control fluid passageway coupled between said longitudinal bore and a control fluid supply input port,
   a vortex valve element having a control fluid inlet coupled to said longitudinal bore through said valve body, a main fluid inlet coupled to said main fluid supply passageway, a vortex chamber to which said control and main fluid inlets are coupled, and an outlet, coupled to said vortex chamber,
   a valve stem supported for axial movement with the longitudinal bore through said valve body and having a first portion that is urged into mechanical engagement with said armature stem, and
   a valve seat, disposed within the longitudinal bore through said valve body, and having a control fluid throat therethrough coupling said longitudinal bore to the control fluid inlet of said vortex valve element, and being arranged to be engaged by a second portion of said valve stem, so that axial movement of said valve stem, in accordance with axial movement of said armature by the operation of said solenoid unit, may control the passage of control fluid from said longitudinal bore through the control fluid inlet throat to said vortex valve.

2. A solenoid-controlled fluid injection device according to claim 1, wherein said valve body further includes a cooling fluid passageway therethrough between cooling fluid inlet and outlet ports.

3. A solenoid-controlled fluid injection device according to claim 1, wherein said fluid flow control valve further includes a spring within said longitudinal bore engaging said valve stem and a spring seat within said longitudinal bore, said spring urging said valve stem into mechanical engagement with said armature stem member.

4. A solenoid-controlled fluid injection device according to claim 3, wherein said valve body has a generally cylindrical configuration and includes a base body portion that is mechanically engagable with said housing and an injection valve body portion extending from said base body portion, said vortex valve element being in contiguous engagement with an end of said injection valve body portion.

5. A solenoid-controlled fluid injection device according to claim 4, wherein said fluid flow control valve further includes a nozzle cap member having a nozzle coupled in fluid communication with the outlet of said vortex valve element, said nozzle cap member capturing said vortex valve element and mechanically engaging said injection valve body portion so as to retain said vortex valve element in contiguous engagement with said end of said injection valve body portion.

6. A solenoid-controlled fluid injection device according to claim 1, wherein said valve stem has a generally cylindrical shape with an annular indent portion and a depression region longitudinally extending therefrom so as to provide, in cooperation with the longitudinal bore through said valve body, a control fluid cavity region extending along the surface of said valve stem and thereby maintaining a fluid communication path between said control fluid supply input port and the control fluid inlet of the vortex chamber of said vortex valve element.

7. A solenoid-controlled fluid injection device according to claim 4, wherein said housing is of generally cylindrical configuration and is mechanically joined with said valve body such that control fluid within the longitudinal bore is in fluid communication with the coaxial bore of said housing and, in the absence of the operation of said solenoid unit, is coupled through the throat in said valve seat to the inlet of said vortex valve but, in response to the operation of said solenoid unit, thereby closing said valve stem against said valve seat, is effectively confined within said bores.

8. A solenoid-controlled fluid injection device according to claim 7, wherein said solenoid unit further includes an armature guide sleeve through which said armature stem slides to engage said valve stem, said armature guide sleeve being captured within the bore of said housing.

9. A solenoid-controlled fluid injection device according to claim 8, wherein said armature guide sleeve is spaced apart from said armature by a spacer member of non-magnetic material and a gap therebetween.

10. A solenoid-controlled fluid injection device according to claim 9, wherein said armature includes a longitudinally extending fluid flow passageway through which control fluid within the bore of said housing may flow.

11. A solenoid-controlled fluid injection device according to claim 2, wherein said valve body has a generally cylindrical configuration and includes a base body portion that is mechanically engagable with said housing and an injection valve body portion extending from said base body portion, said vortex valve element being in contiguous engagement with an end of said injection valve body portion.

12. A solenoid-controlled fluid injection device according to claim 11, wherein said fluid flow control valve further includes a nozzle cap member having a nozzle coupled in fluid communication with the outlet of said vortex valve element, said nozzle cap member capturing said vortex valve element and mechanically engaging said injection valve body portion so as to retain said vortex valve element in contiguous engagement with said end of said injection valve body portion.

13. A solenoid-controlled fluid injection device according to claim 12, wherein said cooling fluid passageway comprises a first cooling fluid bore extending from a first cooling fluid coupling port through said injection valve body portion to said vortex valve element, said vortex valve element having a cooling fluid inlet, a cooling fluid outlet, and a cooling fluid communication path therebetween, said cooling fluid outlet opening to an outer wall of said vortex element that is covered by said nozzle cap, whereby cooling fluid is permitted to travel between the exterior surface of said injection valve body portion and said nozzle cap, said first cooling fluid bore being coupled with the cooling fluid inlet of said vortex element, and a second cooling fluid bore being coupled to an outer wall of said injection valve body portion.

14. A solenoid-controlled fluid injection device comprising:
a wet solenoid unit including a housing having a longitudinal axis and a fluid-sealing bore coaxial therewith, said housing containing an electromagnetic coil for producing a magnetic field, and being made of magnetic material for providing a flux path for said magnetic field, a longitudinal cylindrical armature having a fluid flow aperture therethrough and disposed for axial movement within said fluid-sealing bore, and a coaxial armature stem member affixed to said movable armature; and
a fluid flow control valve coupled with said wet solenoid unit, and including
a generally cylindrical valve body having a longitudinal bore that is coaxial with the fluid-sealing bore of said housing, a working fluid supply passageway coupled to a working fluid supply input port, and a control fluid passageway coupled between said longitudinal bore and a control fluid supply input port,
a vortex valve element having a control fluid inlet coupled to said longitudinal bore through said valve body, a main fluid inlet coupled to said working fluid supply passageway, a vortex chamber to which said control and working fluid inlets are coupled, and an outlet, coupled to said vortex chamber,
a valve stem supported for axial movement with the longitudinal bore through said valve body and having a first portion urged toward and into mechanical engagement with said armature stem, and
a valve seat, disposed within the longitudinal bore through said valve body, and having a control fluid throat therethrough coupling said longitudinal bore to the control fluid inlet of said vortex valve element, and being arranged to be engaged by a second portion of said valve stem, so that in the absence of the energization of said coil, with said valve stem being urged toward said armature stem, the second portion of said valve stem is urged away from said valve seat and thereby enable the passage of control fluid through said control fluid throat to said vortex valve to prevent said working fluid from being supplied from the outlet of said vortex valve, but in response to the energization of said coil, said valve stem is urged, by the axial translation of said armature and said armature stem, so that the second portion of said valve stem is urged against said valve seat and thereby interrupts the passage of control fluid through said control fluid throat to said vortex valve, whereby said working fluid is supplied from the outlet of said vortex valve.

15. A solenoid-controlled fluid injection device according claim 14, wherein said fluid flow control valve further includes a spring within the longitudinal bore of said body engaging said valve stem and a spring seat within said longitudinal bore, said spring urging said valve stem into mechanical engagement with said armature stem.

16. A solenoid-controlled fluid injection device according to claim 15, wherein said valve body includes a base body portion that is mechanically engagable with said housing and a injection valve body portion extending from said base body portion, said vortex valve element being in contiguous engagement with an end face of said injection valve body portion.

17. A solenoid-controlled fluid injection device according to claim 16, wherein said fluid flow control valve further includes a nozzle cap having a fluid spray nozzle coupled in fluid communication with the outlet of said vortex valve element, said nozzle cap member capturing said vortex valve element and mechanically engaging said injection valve body portion so as to retain said vortex valve element in contiguous engagement with said end face of said injection valve body portion.

18. A solenoid-controlled fluid injection device according to claim 17, wherein said valve stem has a generally cylindrical shape with an annular indent portion and a depression region longitudinally extending therefrom, so as to provide, in cooparation with the longitudinal bore through said valve body, a control fluid cavity region extending along the surface of said valve stem and thereby maintaining a fluid communication path between said control fluid supply input port and the control fluid inlet of the vortex chamber of said vortex valve element.

19. A solenoid-controlled fluid injection device according to claim 18, wherein said solenoid unit further includes an armature guide sleeve through which said armature stem slides to engage said valve stem, said armature guide sleeve being captured within the bore of said housing.

20. A solenoid-controlled fluid injection device according to claim 19, wherein said armature guide sleeve is spaced apart from said armature by a spacer member of non-magnetic material and a gap therebetween.

21. A solenoid-controlled fluid injection device according to claim 18, wherein said valve body further includes a cooling fluid passageway therethrough between cooling fluid inlet and outlet ports.

22. A solenoid-controlled fluid injection device according to claim 21, wherein said cooling fluid passageway comprises a first cooling fluid bore extending from a first cooling fluid coupling port through said injection valve body portion to said vortex valve element, said vortex valve element having a cooling fluid inlet, a cooling fluid outlet, and a cooling fluid communication path therebetween, said cooling fluid outlet opening to an outer wall of said vortex element that is covered by said nozzle cap, whereby cooling fluid is permitted to travel between the exterior surface of said injection valve body portion and said nozzle cap, said first cooling fluid bore being coupled with the cooling fluid inlet of said vortex element, and a second cooling fluid bore being coupled to a outer wall of said injection valve body portion.

* * * * *